United States Patent
Jeong et al.

(10) Patent No.: US 7,663,842 B2
(45) Date of Patent: Feb. 16, 2010

(54) ACTUATOR APPARATUS OF A HARD DISK DRIVE

(75) Inventors: Ki-tag Jeong, Hwaseong-si (KR);
Woo-sung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 11/622,109

(22) Filed: Jan. 11, 2007

(65) Prior Publication Data

US 2007/0195465 A1    Aug. 23, 2007

(30) Foreign Application Priority Data

Jan. 11, 2006    (KR) .................. 10-2006-0003101

(51) Int. Cl.
*G11B 21/22* (2006.01)
*G11B 5/54* (2006.01)
*G11B 21/02* (2006.01)

(52) U.S. Cl. ................. 360/256.2; 360/265.1

(58) Field of Classification Search ............. 360/256, 360/256.2, 265.1
See application file for complete search history.

(56) References Cited

U.S. PATENT DOCUMENTS

| | | | | |
|---|---|---|---|---|
| 5,170,300 A | * | 12/1992 | Stefansky | 360/256.2 |
| 5,608,592 A | * | 3/1997 | Mizoshita et al. | 360/256.2 |
| 5,742,453 A | * | 4/1998 | MacPherson | 360/256.2 |
| 5,801,907 A | * | 9/1998 | Yagi et al. | 360/256.2 |
| 6,252,744 B1 | * | 6/2001 | Kelemen | 360/256.2 |
| 6,445,548 B1 | * | 9/2002 | Sasaki et al. | 360/256.2 |
| 6,542,335 B1 | * | 4/2003 | Misso et al. | 360/256.2 |
| 7,042,671 B2 | * | 5/2006 | Yoshikawa et al. | 360/75 |

FOREIGN PATENT DOCUMENTS

JP    01319181 A   * 12/1989

(Continued)

OTHER PUBLICATIONS

Englsih-machine translation of JP 08-227566 A to Ishizaki et al., published on Sep. 3, 1996.*

*Primary Examiner*—William J Klimowicz
(74) *Attorney, Agent, or Firm*—Stanzione & Kim LLP

(57) ABSTRACT

An actuator apparatus used with a hard disk drive. The actuator apparatus includes a pivotable actuator arm, a magnetic head mounted onto a first end of the actuator arm, an overmold connected to a second end of the actuator arm and including a metal piece, a voice coil motor (VCM) having a coil coupled to the overmold and at least one magnet positioned to face the coil, and a stopper positioned to be spaced apart at a predetermined interval from the overmold of the actuator arm when the magnetic head is positioned at a parked position, to limit pivoting of the actuator arm. Specifically, the stopper may be positioned to be spaced at the interval from the overmold of the actuator arm positioned at a position where a torque acting on the actuator arm due to the metal piece and the magnet is substantially 0. Accordingly, the torque acting on the actuator arm within the interval is in an opposite direction to a direction in which the actuator arm pivots to a parked position, thereby reducing the pivoting speed of the actuator arm. Thus, noise and impulse caused by the contact of the actuator arm and the stopper reduce.

7 Claims, 3 Drawing Sheets

FOREIGN PATENT DOCUMENTS

| | | | |
|---|---|---|---|
| JP | 05174528 A * | 7/1993 |  |
| JP | 07031118 A * | 1/1995 |  |
| JP | 7-176152 | 7/1995 |  |
| JP | 7-320426 | 12/1995 |  |
| JP | 08227566 A * | 9/1996 |  |
| JP | 2004-178790 | 6/2004 |  |

* cited by examiner

ACTUATOR APPARATUS OF A HARD DISK DRIVE

CROSS-REFERENCE TO RELATED APPLICATIONS

This application claims priority under 35 U.S.C. 119 §(a) from Korean Patent Application No. 10-2006-0003101, filed on Jan. 11, 2006, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to an actuator apparatus used with a hard disk drive having a structure to reduce noise and an impulse occurring by contact of an actuator and a stopper when a magnetic head is unloaded.

2. Description of the Related Art

An HDD (hard disk drive) is an example of an auxiliary memory device used in a computer, which reproduces data from a disk or records data onto a disk using a magnetic head.

FIG. 1 is a plan view schematically illustrating a conventional HDD, and FIG. 2 is an enlarged plan view illustrating a voice coil motor portion of a conventional actuator apparatus for the HDD of FIG. 2.

Referring to FIGS. 1 and 2, the HDD includes a magnetic disk (a hard disk) 3, that is, a recording medium for recording data, a spindle motor 2 positioned on a base member 1 for rotating the magnetic disk 3, and an actuator 10 having a magnetic head 14 for recording and reproducing data on and from the magnetic disk 3.

One or more disks spaced apart from each other at a predetermined interval are positioned so as to be rotated by the spindle motor 2. A ramp 5 is positioned outside the magnetic disk 3 for placing the magnetic head 14 thereon from the data recording surface of the magnetic disk 3 and safely holding the magnetic head 14 when the power is cut off.

The actuator 10 includes an actuator arm 11 positioned to pivot about a pivot shaft (not illustrated) positioned on the base member 1. The actuator arm 11 has a pivot hole 12 in its middle portion to be pivotably connected to the pivot shaft. The magnetic head 14 is positioned at one end, i.e., the front end, of the actuator arm 11, and an overmold 13 is coupled to the other end, i.e., the rear end, of the actuator arm 12, to be connected with a coil 15 of a voice coil motor (VCM). The actuator arm 11 is rotated by the VCM.

As described above, the VCM includes the coil 15 connected to the rear end of the actuator arm 11. A lower yoke 16 is positioned at a predetermined interval under the coil 15 and fixed to the base member 1. An upper yoke (not illustrated) is positioned over the coil 15 and connected to the lower yoke 16 by a screw. A magnet 17 is attached on the upper surface of the lower yoke 16 and spaced from the coil 15 at a predetermined interval.

In the conventional HDD having the aforementioned structure, a lift force by a rotation of the magnetic disk 3 acts on the magnetic head 14 during a data recording/reproducing operation. Accordingly, the magnetic head 14 is maintained in a floating state at a predetermined interval from the magnetic disk 3 due to the lift force, and records and reproduces data on and from the rotating magnetic disk 3 in this state.

When power is cut off and the disk 3 stops rotating, the lift force disappears. Before the lift force disappears, the magnetic head 14 moves from the data recording surface of the magnetic disk 3, thereby preventing any disk damage by a contact with the disk 3. That is, before the magnetic disk 3 stops rotating completely, when the actuator arm 11 is rotated by the VCM such that the magnetic head 14 moves over the ramp 5 outside the magnetic disk 3, the magnetic head 14 is safely held on the ramp 5 though the magnetic disk 3 stops rotating, thereby preventing damage to the disk 3.

When the power is turned on and the magnetic disk 3 starts rotating again, the lift force is generated again, and the magnetic head 14 moves above the magnetic disk 3 from the ramp 5 since the actuator arm 11 is rotated by the VCM. The magnetic head 14 moving onto the magnetic disk 3 floats from the surface of the magnetic disk 3 by the lift force generated by the rotation of the magnetic disk 3, and moves to a desired position by the pivot motion of the actuator arm 11. Thus, the magnetic head 14 records or reproduces data on or from the magnetic disk 3, as described above.

The HDD includes an actuator locking apparatus (not illustrated) for locking the actuator 10 not to pivot after the magnetic head 14 is safely held on the ramp 5 while positioned outside the surface area of the magnetic disk 3. The actuator locking apparatus prevents the magnetic head 14 from moving from the ramp 5 onto the magnetic disk 3 as the actuator 10 arbitrarily pivots by an external impact when power is off.

When the magnetic head 14 is safely held on the ramp 5, the overmold 13 coupled to the rear end of the actuator arm 11 comes into contact with a stopper 20 positioned at the lower yoke 16, so that the magnetic head 14 does not leave the ramp 5.

Below, the structure of the aforementioned conventional actuator apparatus and its problems will be described.

FIG. 3 is a plan view of a VCM portion illustrating the conventional actuator apparatus. FIG. 3 illustrates the position of the actuator arm 11 without the stopper 20.

Referring to FIGS. 1 through 3, the stopper 20 is positioned in the lower yoke 16 forming the VCM, a retract pin 19 including a magnetic substance is positioned in the overmold 13 of the actuator arm 11, and a protrusion region 18 for interacting with the retract pin 19 is formed on the magnet 17 forming the VCM. A magnetic force generated by a leakage magnetic flux from the protrusion region 18 of the magnet 17 acts on the retract pin 19 positioned in the actuator arm 11, thereby generating a torque that rotates the actuator arm 11 clockwise and counter-clockwise about the pivot shaft.

When there is no command from a host for predetermined period of time, when a serious danger occurs when operating a disk drive, or when the power is cut off, the HDD moves the magnetic head 14 to the ramp 5 such that the magnetic head 14 is secured on the ramp 5, thereby preventing the magnetic head 14 from any damage caused by colliding with the magnetic disk 3. In the conventional actuator 10, in order to prevent the magnetic head 14 from breaking from the ramp 5 after the magnetic head 14 is secured on the ramp 5, the overmold 13 of the actuator arm 11 contacts the stopper 20 positioned in the lower yoke 16. That is, while the overmold 13 of the actuator arm 11 is in contact with the stopper 20 positioned in the lower yoke 16, the clockwise torque continuously acts on the actuator arm 11. FIG. 3 illustrates the position of the actuator arm 11 without the stopper 20, where the torque generated by the retract pin 19 and the protrusion region 18 of the magnet 17 is 0. In this position, regardless of the direction in which the actuator arm 11 rotates, the torque is generated in the opposite direction to the rotation direction of the actuator arm 11, and thus the actuator arm 11 returns to its original position.

In the conventional actuator 10 having the aforementioned structure, when the magnetic head 14 is unloaded, that is, the magnetic head 14 is parked on the ramp 5, the clockwise torque generated by the retract pin 19 and the protrusion region 18 of the magnet 17 is added to the clockwise torque of the actuator arm 11 in the VCM. Thus, the overmold 13 of the actuator arm 11 collides hard with the stopper 20.

In this case, noise is generated and an impact force acts on the magnetic head 14, thereby affecting the performance of the magnetic head 14.

The noise and impact experienced during the collision of the overmold 13 and the stopper 20 when the magnetic head 14 of the actuator 10 is parked on the ramp 5 have a bad influence upon the actuator 10, thereby affecting the performance of a disk drive and the working conditions of a user.

SUMMARY OF THE INVENTION

The present general inventive concept provides an actuator apparatus used with a hard disk drive (HDD) having a structure to reduce noise and an impulse occurring by the contact of an overmold and a stopper when an actuator is parked, by maintaining a certain interval between the overmold of an actuator arm and the stopper at the position where the torque acting on the actuator arm is 0.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept are achieved by providing an actuator apparatus used with an HDD, the actuator apparatus including a pivotable actuator arm, a magnetic head mounted onto a first end of the actuator arm, an overmold connected to a second end of the actuator arm and having a metal piece, a voice coil motor (VCM) having a coil coupled to the overmold and at least one magnet positioned to face the coil, and a stopper for limiting a pivot motion of the actuator arm, the stopper being spaced at a predetermined interval from the overmold of the actuator arm when the magnetic head parks.

The stopper may be positioned to be spaced at the interval from the overmold of the actuator arm positioned at the position where the torque acting on the actuator arm by the metal piece and the magnet is substantially 0. In this case, the torque acting on the actuator arm within the interval may be in the opposite direction to the direction in which the actuator arm pivots to a parked position.

The stopper may be positioned in the VCM, i.e., the VCM may further include at least one yoke to which the at least one magnet is attached, and the stopper may be positioned in the yoke.

The magnet may form a protrusion region such that torque is applied to the actuator arm by the magnetic force acting between the protrusion region of the magnet and the metal piece.

In accordance with the present general inventive concept, a more stable operation of the actuator apparatus may be realized because noise and impulse caused by the contact of the actuator arm and the stopper decrease.

The foregoing and/or other aspects and utilities of the general inventive concept are achieved by providing an actuator of a hard disk drive, including a base, a pivotal actuator arm having a first end that pivots between a parking position and positions above a disk to read and write from and to the disk, a metallic member positioned on a second end of the actuator arm, a voice coil motor (VCM) including a coil coupled to the second end of the actuator arm and a magnet disposed at the base to face the VCM; and a stopper disposed on the base to be spaced apart from the second end of the actuator arm by a predetermined interval when the actuator is pivoted in the parking position to limit further pivoting of the actuator arm.

The predetermined interval at which the stopper can be disposed to be spaced apart from the second end of the actuator arm can be a position in which a torque acting on the actuator arm due to a force between the magnet and the metallic member has a value of substantially 0.

An overmold can be disposed on the second end of the actuator arm, which can contact the stopper when the actuator arm moves to the parking position.

The magnet can include a protrusion extending therefrom which can interact with the metallic member to create the torque.

The foregoing and/or other aspects and utilities of the general inventive concept are achieved by providing a method of controlling an actuator of a hard disk drive while in a parked position, the method including creating opposing torques at a rear portion of the actuator to control movement of the actuator in clockwise and counterclockwise directions, and disposing a stopper at a predetermined position to stop further movement of the actuator when parked in the parking position, the predetermined position being determined based on a point at which the opposing torques create an overall torque of 0 applied to the actuator arm.

The predetermined position is a position at which the opposing torques applied to the actuator is substantially 0.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
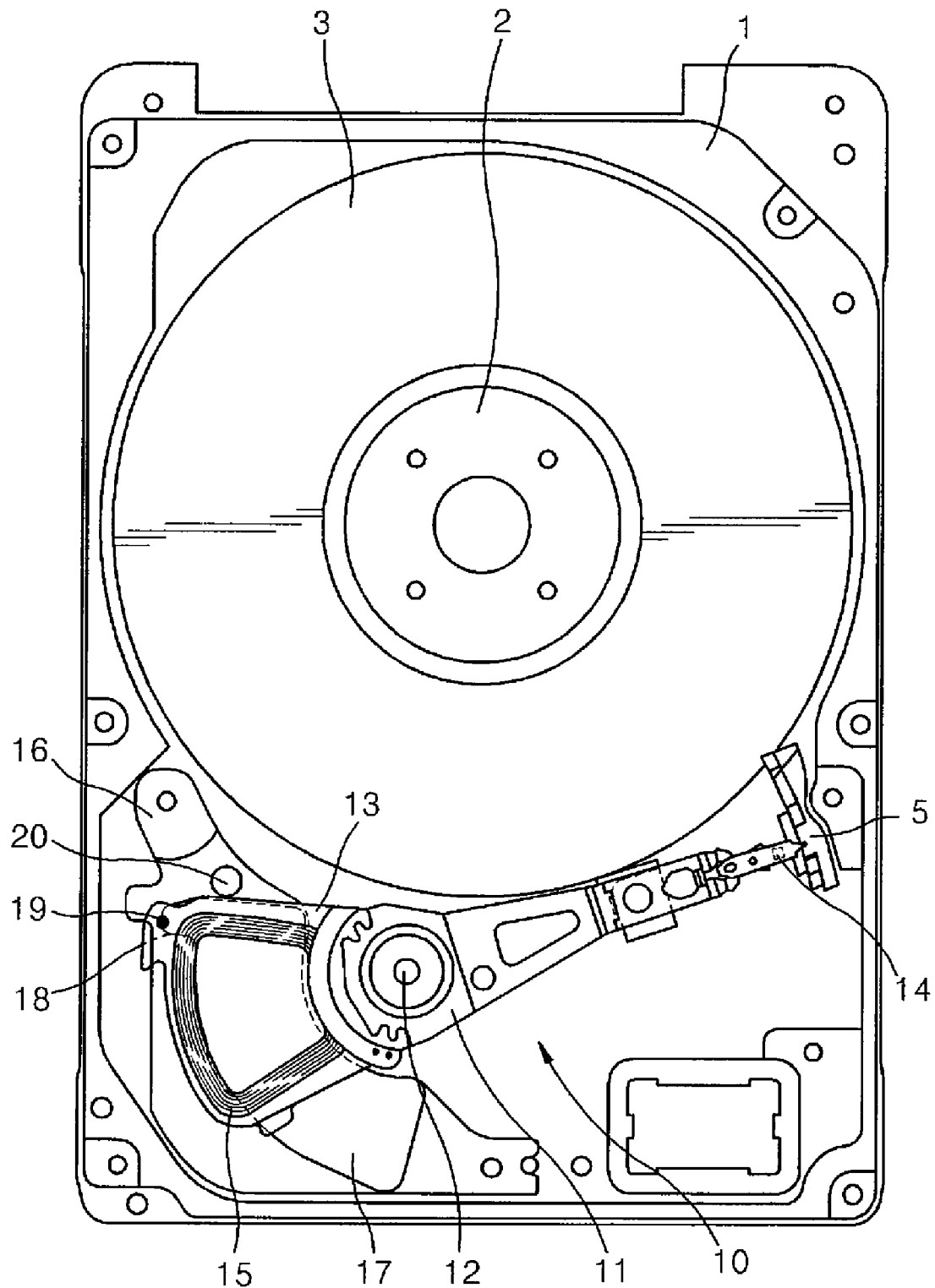
FIG. 1 is a plan view schematically illustrating a conventional hard disk drive (HDD)
Figure 2:
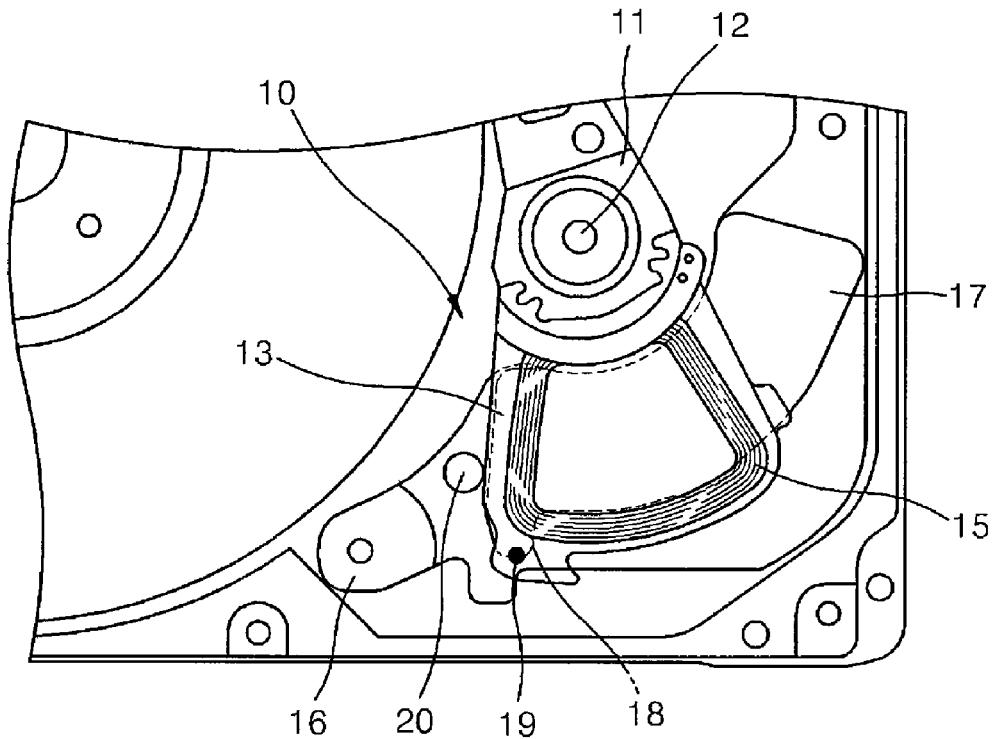
FIG. 2 is an enlarged plan view illustrating a voice coil motor (VCM) portion of a conventional actuator apparatus.
Figure 3:
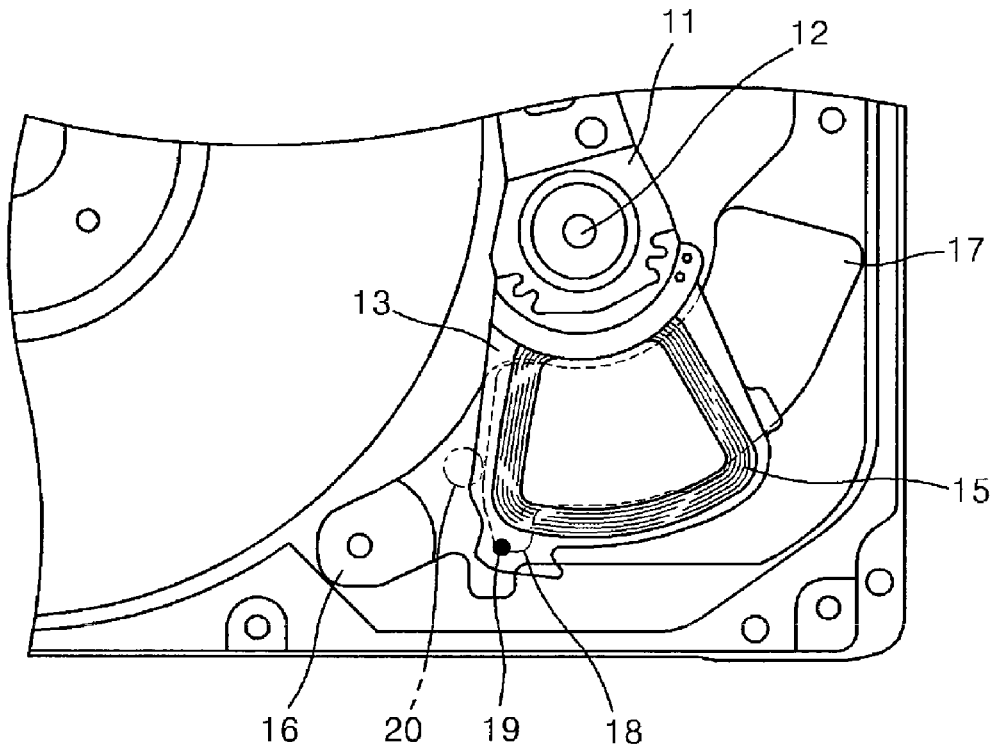
FIG. 3 is a plan view illustrating the VCM portion of FIG. 2 to illustrate the conventional actuator apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
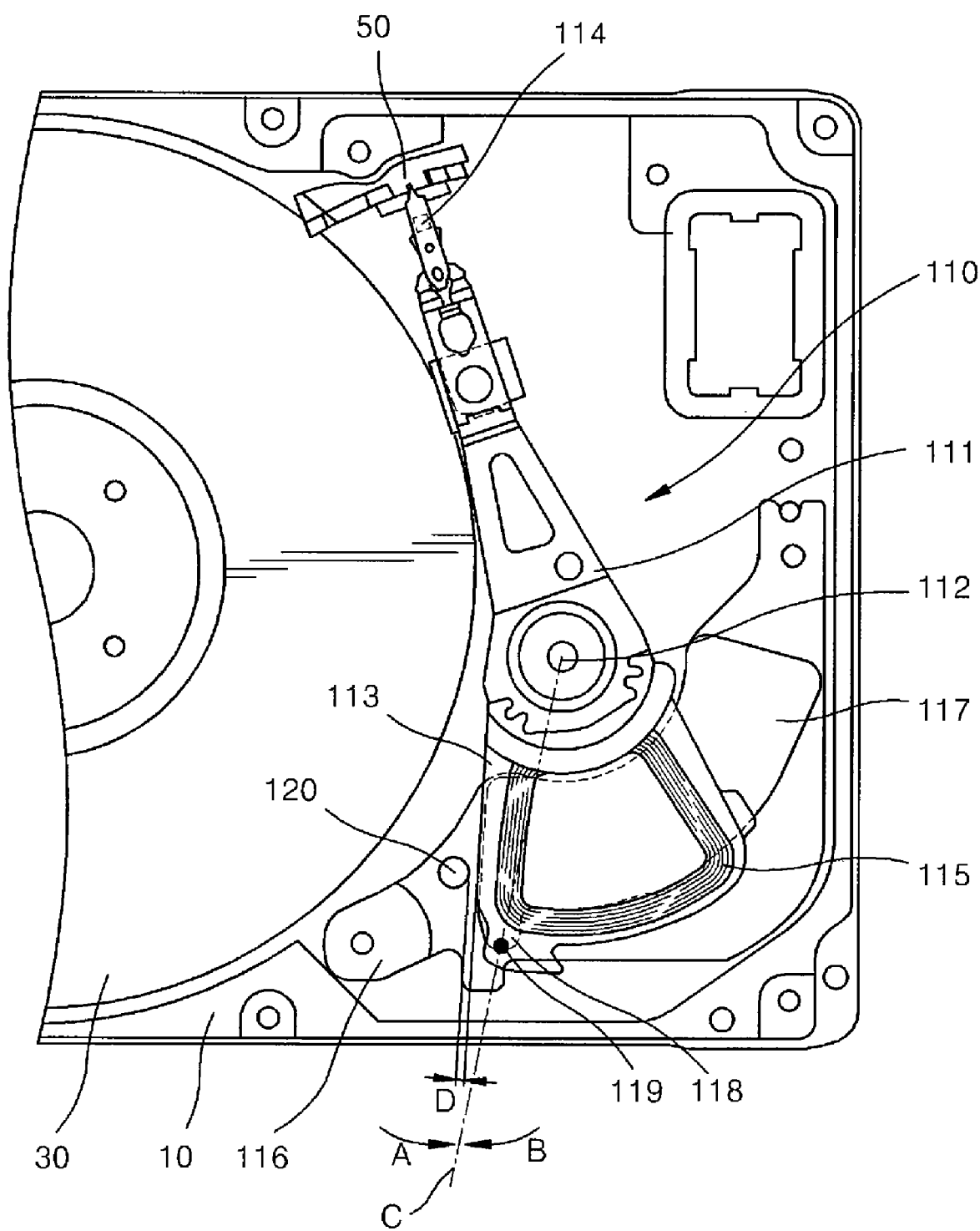
FIG. 4 is a plan view illustrating an actuator apparatus of an HDD according to the present general inventive concept.

FIG. 4 is a plan view illustrating an actuator apparatus of an HDD according to an embodiment of the present general inventive concept. More specifically, FIG. 4 illustrates an enlarged voice coil motor (VCM) portion of the actuator apparatus.

Referring to FIG. 4, the HDD includes an actuator 110 to move a magnetic head 114 that records data from and reproduces data to a predetermined position over a disk 30. The actuator 110 is pivotably positioned on a base member 10 of the HDD by a pivot hole 112 located approximately in the middle portion of an actuator arm 111. The actuator arm 111 may be manufactured by a pressing process or a stamping process for metal materials, for example, an aluminum plate.

In the HDD of the present general inventive concept, a VCM is positioned to pivot the actuator arm 111. The VCM can include a coil 115 connected to a rear end of the actuator arm 111, a lower yoke 116 positioned under the coil 115, and an upper yoke (not illustrated) positioned over the coil 115. A magnet 117 is attached to the top surface of the lower yoke 116 and is spaced apart at a predetermined interval from the coil 115. The magnet 117 and the coil 115 are positioned to face each other. Otherwise, the magnet 117 may be attached to only the bottom surface of an upper yoke (not illustrated) or both of the top surface of the lower yoke 16 and the bottom surface of the upper yoke (not illustrated). For this purpose, a permanent magnet (not illustrated) is usually used.

The coil 115 is connected to the rear end of the actuator arm 111 by interposing an overmold 113 between the coil 115 and the actuator arm 111. Specifically, the overmold 113 can be formed by injection molding plastic resin between the coil 115 and the actuator 111. The lower yoke 116 is spaced apart at a predetermined interval from the coil 115 and fixed onto the base member 10 of the HDD. The upper yoke (not illustrated) can be connected to the lower yoke 116 by a predetermined fastening unit.

A servo control system controls the aforementioned VCM and pivots the actuator arm 111 in a predetermined direction according to Fleming's left hand rule by interacting a current input to the coil 115 with a magnetic field formed by the magnet 117. That is, when the HDD is powered on and the disk 30 starts to rotate, the VCM pivots the actuator arm 111 counter-clockwise such that the magnetic head 114 moves above the disk 30 from a ramp 50 positioned outside the surface area of the disk 30. When the power is being turned off and the disk 30 is going to stop rotating, the VCM pivots the actuator arm 111 clockwise such that the magnetic head 114 moves from a position above the disk 30 to the ramp 50 positioned outside the surface area of the disk 30, and the magnetic head 114 is therefore safely held and securely positioned on the ramp 50.

The system to park the magnetic head 114 by using the ramp 50 positioned outside the surface area of the disk 30 is described above. However, in another HDD, a system to securely park a magnetic head to be safely held in a parking zone may be used in lieu of a ramp. In this case, a parking zone is formed in an inner circumferential side of a disk and a data zone is formed in an outer circumferential side of the disk. Thus, when the HDD is powered and the disk rotates, the VCM pivots the actuator arm clockwise such that the magnetic head moves from the parking zone of the inner circumferential side of the disk to the data zone of the outer circumferential side. In contrast, when the power is turned off and the disk stops rotating, the VCM pivots the actuator arm counter-clockwise such that the magnetic head moves from the data zone to the parking zone of the data and is securely positioned and held at the parking zone.

The present general inventive concept may be applied to both of the aforementioned systems. However, an embodiment of the present general inventive concept will be described below with respect to a parking system using a ramp 50.

The HDD includes an actuator 110 according to an embodiment of the present general inventive concept. In the actuator 110, when an HDD performs a parking command and a magnetic head 114 mounted on a front end of an actuator arm 111 is parked on the ramp 50 positioned outside a disk 30, an overmold 113 is connected to a rear end of the actuator arm 111 and comes into contact with a stopper 120 positioned in a lower yoke 116. That is, the actuator 110 prevents the magnetic head 114 mounted on the actuator arm 111 from breaking away from the ramp 50 when the parking command is performed. If the magnetic head 114 breaks away from the ramp 50, the magnetic head 114 may be damaged.

In the actuator 110, a magnetic force generates a torque on the actuator arm 111 by a magnet 117 attached to the top surface of the lower yoke 116 of a VCM. For this purpose, a metal piece 119 including a magnetic substance can be positioned in the overmold 113 of the actuator arm 111, and a protrusion region 118 can be formed in the magnet 117. The magnetic force between the protrusion region 118 and the metal piece 119 causes a torque on the actuator arm 111 in a predetermined direction.

The structure and operation of the actuator 110 in accordance with an embodiment of the present general inventive concept will be described in detail with reference to FIG. 4 below:

Referring to FIG. 4, the actuator 110 can include the metal piece 119 positioned in the overmold 113. The magnetic force generated in the protrusion region 118 of the magnet 117 attached to the top surface of the lower yoke 116 causes the metal piece 119 to apply the torque in the predetermined direction to the actuator arm 111. The metal piece 119 pivots in the predetermined direction, together with the actuator arm 111, and stops at a specific position (line C) together with the actuator arm 111 when the torque applied to the actuator arm 111 is substantially 0. The actuator arm 111 is pivotable from side to side based on that position, that is, in the directions of arrows A and B. When the overmold 113 of the actuator arm 111 comes close to the disk 30 as a result of a VCM operation, that is, when the actuator arm 111 pivots toward the disk 30 in the direction of arrow B, thereby passing line C, the counter-clockwise torque, i.e., the torque in the direction of arrow A, acts on the actuator arm 111 due to the metal piece 119 and the protrusion region 118 of the magnet 117. On the contrary, when the overmold 113 of the actuator arm 111 moves away from the disk 30, the clockwise torque, i.e., the torque in the direction of arrow B, acts on the actuator arm 111.

When the actuator arm 111 is positioned in the parking position, the stopper 120 is spaced apart at a predetermined interval D from the overmold 113 of the actuator arm 111. Specifically, when the actuator arm 111 is positioned at line C, where the torque acting on the actuator arm 111, that is, the torque generated by the interaction of the protrusion region 118 of the magnet 117 and the metal piece 119 positioned in the overmold 113, is substantially 0, the interval D exists between the overmold 113 of the actuator arm 111 and the stopper 120. The interval D may be determined by an intensity of the force generated by the protrusion region 118 of the magnet 117 and the metal piece 119, and also may be determined by a size of the metal piece 119.

In the actuator 110 having the above-described structure, the magnetic head parks in a secure position, i.e., a parking position, to prevent the collision of the magnetic head 114 and the disk 30 when no command from a host for a predetermined period of time exists, when a fatal danger in operating a disk drive occurs, or when power is cut off. For this purpose, the VCM pivots the actuator arm 111 and the magnetic head 114 moves to the parking position, i.e., the ramp 50 positioned outside the surface area of the disk 30 or the parking zone formed in the inner circumferential side of the disk. At this time, the overmold 113 of the actuator arm 111 comes into contact with the stopper 120, thereby preventing the magnetic head 114 from escaping from the parking position.

In the actuator 110, the actuator arm 111 pivots clockwise, i.e., in the direction of arrow B, to move the magnetic head 114 to the parking position. When the overmold 113 of the actuator arm 111 pivots in the direction of arrow B and passes line C, the counter-clockwise torque (in the direction of arrow A) acts on the actuator arm 111 due to the interaction of the protrusion region 118 of the magnet 117 and the metal piece 119 positioned in the overmold 113. Accordingly, the pivoting speed of the actuator arm 111 in the direction of arrow B is reduced. Since the actuator arm 111 comes into contact with the stopper 120 at a reduced speed, noise and an impulse force on the actuator 110 reduce as compared to the conventional actuator apparatus.

As described above, in the actuator apparatus for the HDD in accordance with the embodiments of the present general inventive concept, noise and impulse on the actuator, which can be caused by contact of an overmold of an actuator arm and the stopper, are reduced by positioning the stopper so as to be spaced at a certain interval from the overmold of the actuator arm, such that the pivoting speed of the actuator arm is reduced when the actuator arm pivots to park the magnetic head. Thus, the reliability of the HDD is improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An actuator apparatus used with a hard disk drive (HDD), the actuator apparatus comprising:
   an actuator arm that is pivotable;
   a magnetic head mounted onto one end of the actuator arm;
   an overmold connected to the other end of the actuator arm and including a metal piece;
   a voice coil motor (VCM) having a coil coupled to the overmold and at least one magnet positioned to face the coil; and
   a stopper positioned to be spaced apart at a predetermined interval from the overmold of the actuator arm when the magnetic head is positioned at a parking position to limit pivoting of the actuator arm,
   wherein the overmold contacts the stopper when the actuator arm moves to the parking position and the stopper is positioned where a torque acting on the actuator arm due to the metal piece and the magnet is substantially 0.

2. The actuator apparatus of claim 1, wherein a torque acting on the actuator arm within the predetermined interval is in an opposite direction to a direction in which the actuator arm pivots to the parking position.

3. The actuator apparatus of claim 1, wherein the stopper is positioned in the voice coil motor.

4. The actuator apparatus of claim 3, wherein the voice coil motor further includes at least one yoke attached to the at least one magnet, and the stopper is positioned in the yoke.

5. The actuator apparatus of claim 1, wherein the at least one magnet comprises a protrusion region, and a magnetic force acts between the protrusion region of the magnet and the metal piece to apply a torque to the actuator arm.

6. An actuator of a hard disk drive, comprising:
   a base;
   a pivotal actuator arm having a first end that pivots between a parking position and positions above a disk to read and write from and to the disk;
   a metallic member positioned on a second end of the actuator arm;
   a voice coil motor (VOM) including a coil coupled to the second end of the actuator arm and a magnet disposed at the base to face the VCM;
   a stopper disposed on the base to be spaced apart from the second end of the actuator arm by a predetermined interval when the actuator is pivoted in the parking position to limit further pivoting of the actuator arm; and
   an overmold disposed on the second end of the actuator arm which contacts the stopper when the actuator arm moves to the parking position,
   wherein the predetermined interval at which the stopper is disposed to be spaced apart from the second end of the actuator arm is a position in which a torque acting on the actuator arm due to a force between the magnet and the metallic member has a value of substantially 0.

7. The actuator of claim 6 wherein the magnet includes a protrusion extending therefrom which interacts with the metallic member to create the torque.

* * * * *